Patented May 28, 1929.

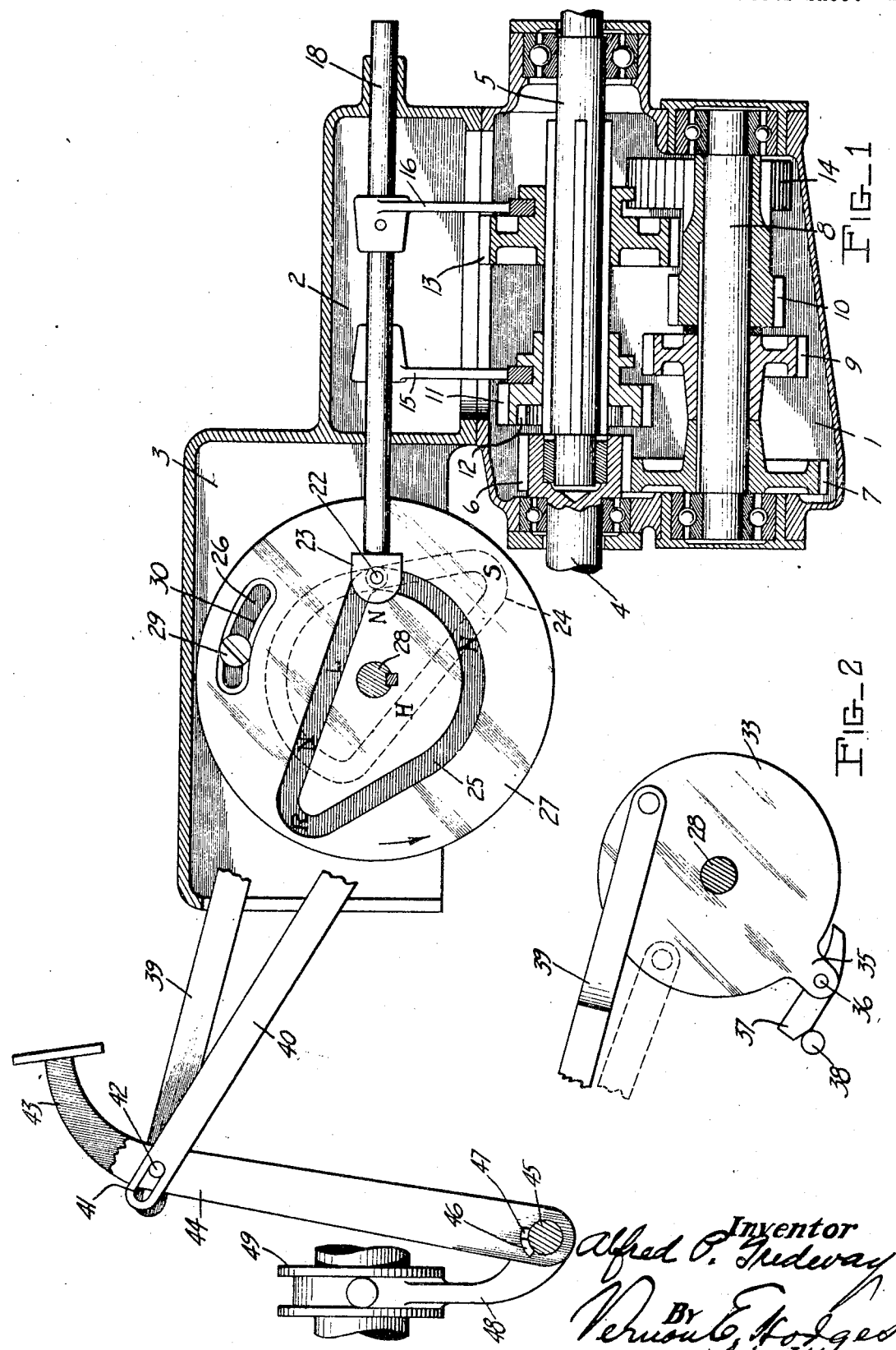

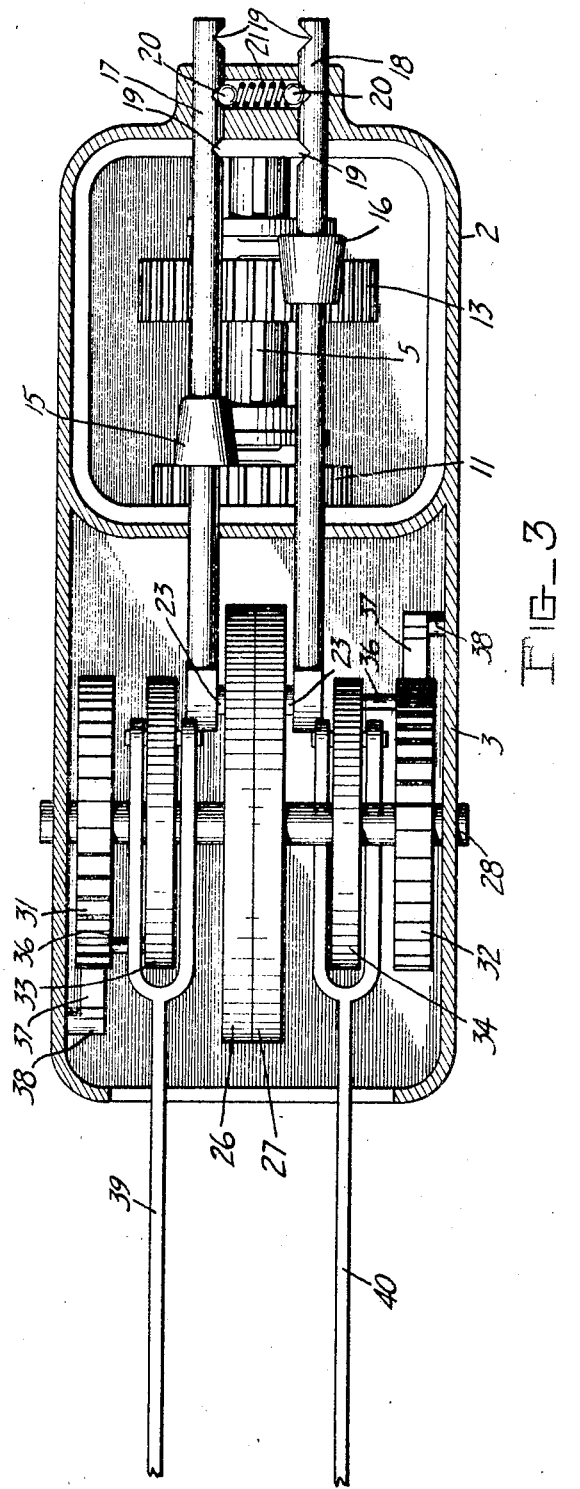

1,715,178

UNITED STATES PATENT OFFICE.

ALFRED P. TREDWAY, OF SHOALS, INDIANA.

GEAR SHIFT FOR MOTOR VEHICLES.

Application filed November 16, 1926. Serial No. 148,738.

This invention relates to an improvement in gear shifts for motor vehicles.

The object of the invention is to shift the gears of a selective transmission entirely from foot pedals, so that the operator of the vehicle will always have both hands entirely free to insure absolute control of the machine.

The shift mechanism constituting this invention is especially adapted to the ordinary type of selective transmission in which the gears are moved by means of yokes connected therewith and supported on shift rods slidably mounted in the casing. In this improved form of shifting mechanism, these rods are operated from cams which are in turn moved by foot pedals through suitable ratchet wheels and disks for controlling the same.

A cam wheel is provided for each of the slidable shift rods and these cam wheels may be turned in either direction by the provision of two foot pedals, operating disks which serve to turn the cam wheels in either one or the other direction.

The foot pedals are connected with a clutch shaft so that upon movement of either of the pedals the clutch will be moved out before the gears start to move into mesh.

In the accompanying drawings:

Fig. 1 is a vertical section through a form which illustrates the invention;

Fig. 2 is a detail sectional view through the rock-shaft showing the control disk thereon; and Fig. 3 is a horizontal sectional view through the upper portion of the casing.

Since the invention is adapted for use with any of the well known forms of selective transmissions, the one shown in the drawings is merely for the purpose of illustration.

The casing 1 houses the transmission and is provided with a cover 2 therefor. This cover 2 has a housing 3 mounted on the front end thereof for a purpose to be hereinafter described.

The numeral 4 indicates the driving shaft operated from the motor of the vehicle and the numeral 5 designates the driven shaft adapted to be connected with the driving shaft through the transmission gearing.

The driving shaft 4 has a driving pinion 6 mounted on the end thereof normally meshing with a gear 7 fixed on a jack-shaft 8. This jack shaft 8 also has second-gear 9 and low-gear 10 fixed thereon, as shown in Fig. 1. A sliding gear 11 is slidably keyed on the driven shaft 5 and is provided with internal teeth 12 adapted to be moved into mesh with the driving pinion 6. The gear 11 may also be moved into mesh with a second gear 9. A gear 13 is also slidably keyed on the driven shaft 5 and may be movable into mesh with the low-gear 10 or into mesh with the reverse-gear 14 mounted in the casing 1 in the usual manner for reversing the direction of the driven shaft 5.

The usual yokes 15 and 16 are connected with the gears 11 and 13, respectively, for shifting these gears into mesh with their respective driving gears. The yokes 15 and 16 are mounted on and carried by shift rods 17 and 18 slidably mounted in the cover 2. The rods 17 and 18 are provided with notches 19 in the internal faces thereof, which notches are engaged by the balls 20 normally pressed thereinto by means of the spring 21, as clearly shown in Fig. 3. The purpose of these balls and notches is to resiliently hold the gears in their respective shifted positions.

The forward ends of the rods 17 and 18 have the pins 22 fixed therein on which are mounted the rollers 23. These rollers 23 are received in cam shaped grooves 24 and 25 formed in the cam wheels 26 and 27. Either one or both of these wheels may be keyed on to a rock shaft 28 but if only one of the wheels is fixed thereon, the other may be adjustably connected therewith, by means of a screw 29 and slot 30, as shown in Fig. 1. This provides a suitable means for regulating or adjusting the positions of the cam grooves 24 and 25 relative to each other in assembling the parts in order to insure of the proper control and manipulation of the shifting gears.

Also keyed to the rock shaft 28 are the ratchet wheels 31 and 32 which are turned with their teeth assembled in opposite directions from each other. Loosely mounted on the rock shaft 28 are the disks 33 and 34. As shown in Fig. 2, each of these disks has a depending lug 35 which supports a pin 36 on which is mounted a pawl 37 in position to engage the teeth of either of the ratchet wheels 31 or 32. A stud 38 is in position to hold the pawl 37 out of engagement with its respective ratchet wheel whenever the disks are in the position shown in Fig. 2 or when the other disk is in the opposite position.

Pedal rods 39 and 40 are pivotally connected with the disks 33 and 34, respectively, eccentrically of the rock shaft 28, for the purpose of moving these disks about the rock shaft. As shown in Fig. 1, the forward ends of these rods 39 and 40 are provided with slots 41 which receive pins 42 extending outwardly from the foot pedals 43 and 44. This provides a lost motion connection between foot pedals and pedal rods.

Both of the pedals 43 and 44 are mounted on a clutch shaft 45 and have cam shaped grooves 46 therein, in which the pins 47 connected with the shaft 45 are adapted to move. A yoke 48 may be connected with the clutch shaft 45 for engaging the collar 49 of the usual clutch (not shown), for the purpose of releasing or engaging the clutch.

In operation, the foot pedals 43 and 44 entirely control the shifting of the transmission gears in addition to the movement of the clutch into or out of clutching position. The pedal 43 moves the cam wheels in one direction whereas the pedal 44 moves said wheels in the opposite direction, by reason of the reverse position of the teeth of the ratchet wheels 31 and 32.

Whenever either of the foot pedals 43 or 44 is moved forward to shift the gears the slot 41 and pin 42 allow said pedal to move a short distance before it begins to move the pedal rod 39 or 40, and this interval causes the release of the clutch by reason of the engagement of the end of the cam slot 46 with the pin 47 on the clutch shaft 45. Whenever the pin 42 has reached the forward end of the slot 41, the clutch has been released so that, as the pedal rod 39 or 40 begins to move the disk 33 or 34 and releases the pawl 37 from its pin 38 into engagement with the ratchet wheel 31 or 32, it will cause a movement of the yokes 15 and 16 to move the gears 11 and 13 into their respective positions.

If the pedal 43 is moved forward, it will cause a turning movement of the cam wheels 26 and 27 in the direction of the arrow in Fig. 1, and will move the roller 23 on the shaft 17 to the point H, in which position the teeth 12 are in mesh with the pinion 6 so that the driven shaft 5 is being driven at high speed while the gear 13 remains in neutral. If the pedal 43 is released and then moved forward again, to rotate the cam wheels in another quarter turn, the roller 23 on the shaft 18 will be moved to the point R, while the gear 11 has been moved to neutral in which position the gear 13 is in mesh with the reverse gear 14, causing a turning of the driven shaft 5 in a reverse direction.

In Fig. 1 the gears are shown in neutral and another neutral position is reached beyond the points R and before the point H. The letters S and L designate the second and low positions of the cam grooves 24 and 25, at which points the gear 11 is in mesh with the gear 9 and gear 13 in mesh with gear 10. As the cam is turned further from either of these positions, the gear 11 is being moved out from mesh with its respective gear toward neutral position. When the roller 23 on the rod 18 is at either of the points, L or R, the corresponding roller on the rod 17 is moving in the circular part of the cam groove 24 which permits said rod to remain stationary, holding the gear 11 in neutral position.

Neutral positions are also obtained when either or both of the rollers 23 are at the points designated N in Fig. 1.

It will thus be seen that the gears may be shifted in one direction by means of one foot pedal and in the opposite direction by the other, and all of the shifting of the egars is done entirely by the foot pedals instead of by the hand-shifting levers as is now customary, thus leaving the operator's hands entirely free for steering and control of the vehicle. Each forward movement of either of the foot pedals gives substantially a quarter turn to the disks 33 and 34 and cam wheels 26 and 27, but that is sufficient to move either of the gears 11 or 13 from neutral into mesh with its respective gear or out of mesh with said gear into neutral position.

I claim:—

1. The combination with a selective transmission having slidable gear shifting rods, of cam wheels having cam grooves therein, pins mounted on the rods and extending into the grooves for engagement therewith, a rock shaft connected with the cam wheels, disks loosely mounted on the rock shaft, ratchet wheels fixed on the rock shaft and adjustably connected with the disks, and means for actuating the disks to move the cam wheels and gear shifting rods to control the transmission.

2. The combination with a selective transmission having slidable gear shifting rods, of cam wheels having cam grooves therein, pins mounted on the rods and extending into the grooves for engagement therewith, a rock shaft connected with the cam wheels, ratchet wheels fixed on the rock shaft, disks loosely mounted on the rock shaft, pawls carried by the disks in position for engaging and actuating the ratchet wheels, pedal rods connected with the disks, one of said pedal rods being connected with one of the disks on one side of the rock shaft, the other pedal rod being connected with the other disk on the opposite side thereof, and foot pedals connected with the pedal rod for moving the rock shaft, cam wheels, and gear shifting rods to control the transmission.

3. The combination with a selective transmission having slidable gear shifting rods, of cam wheels having cam grooves therein, pins mounted on the rods and extending into the grooves for engagement therewith, a rock shaft connected with the cam wheels, ratchet wheels fixed on the rock shaft, disks loosely mounted on the rock shaft, pawls carried by the disks in position for engaging and actuating the ratchet wheels, pedal rods connected with the disks, one of said pedal rods being connected with one of the disks on one side of the rock shaft, the other pedal rod being connected with the other disk on the opposite side thereof, foot pedals connected with the pedal rods for moving the rock shaft, cam wheels, and gear shifting rods to control the transmission, said pedal rods having a lost motion connection with the pedals, a clutch shaft upon which the pedals are mounted, each of said pedals having a cam groove therein, pins projecting outwardly from the clutch shaft and extending into the cam grooves in the pedals for connecting said pedals with the clutch shaft, and a clutch yoke connected with and actuated by the clutch shaft.

4. The combination with a shiftable gear, of a wheel having a cam groove therein, a pin extending into the groove for actuation thereby and connected with the gear, a shaft on which said wheel is mounted, and separate and independent pawl and ratchet means for actuating the shaft and wheel in opposite directions.

5. The combination with a shiftable gear, of a wheel having a cam groove therein, means operated from said cam groove for actuating the gear, a shaft on which said wheel is mounted, and separate pawl and ratchet mechanism connected with said shaft on opposite sides of the wheel for operating said wheel in opposite directions.

6. The combination with a shiftable gear, of a wheel having a cam groove therein, means operated from said cam groove for actuating the gear, a shaft on which said wheel is mounted, and separate pawl and ratchet mechanism connected with said shaft on opposite sides of the wheel for operating said wheel in opposite directions, and independent means for actuating each of said pawl and ratchet mechanisms.

In testimony whereof I affix my signature.

ALFRED P. TREDWAY.